US006779115B1

(12) United States Patent
Naim

(10) Patent No.: US 6,779,115 B1
(45) Date of Patent: Aug. 17, 2004

(54) PORTABLE DEVICE USING A SMART CARD TO RECEIVE AND DECRYPT DIGITAL DATA

(75) Inventor: Ari Naim, Secaucus, NJ (US)

(73) Assignee: Digital5, Inc., Lawrenceville, NJ (US)

( * ) Notice: Subject to any disclaimer, the term of this patent is extended or adjusted under 35 U.S.C. 154(b) by 0 days.

(21) Appl. No.: 09/506,642

(22) Filed: Feb. 18, 2000

(51) Int. Cl.[7] .............................................. G06F 1/24
(52) U.S. Cl. ...................... 713/192; 713/152; 713/168; 380/278
(58) Field of Search ................................ 713/192, 153, 713/168; 380/278, 283

(56) References Cited

U.S. PATENT DOCUMENTS

| | | | |
|---|---|---|---|
| 5,191,573 A | 3/1993 | Hair | |
| 5,675,734 A | 10/1997 | Hair | |
| 6,067,076 A | * 5/2000 | Hocker et al. | 345/158 |
| 6,072,468 A | * 6/2000 | Hocker et al. | 345/157 |
| 6,411,715 B1 | * 6/2002 | Liskov et al. | 380/277 |

* cited by examiner

Primary Examiner—Thomas R. Peeso
(74) Attorney, Agent, or Firm—RatnerPrestia

(57) ABSTRACT

A system and method for securely downloading digital music data includes a portable handheld device having a detachable smart card for decrypting encrypted music as it is played thereby allowing the portable device to receive and play encrypted music files. The smart card includes both a digital decryption key and hardware that decrypt the encrypted music using the key. The portable handheld device is configured to connect to a remote server, using the decryption key to establish a secure data communications channel, in order to receive the encrypted music files from the remote server. In an alternative system, a personal computer (PC) that is configured to connect to the smart card allows the PC to download and play the encrypted music. In another aspect of the system and method, the smart card provides the remote server with information that is used to pay for the downloaded digital music data. In one embodiment, the smart card has a stored monetary value that is read and modified by the remote server. Alternatively, data stored on the smart card, such as personal identification information, can be used to bill the end user for the digital data. In another embodiment of the invention, the method includes accessing digital data stored at one or more servers using an access key stored on the smart card. In this embodiment, the method includes reading access keys contained on the smart card and accessing the designated server using the access keys.

28 Claims, 6 Drawing Sheets

000
PORTABLE DEVICE USING A SMART CARD TO RECEIVE AND DECRYPT DIGITAL DATA

FIELD OF THE INVENTION

The present invention relates in general to portable decryption system for an end user. More particularly, the present invention relates to a smart card for use with portable handheld device and personal computers to enable the user to securely purchase and play digital music.

BACKGROUND OF THE INVENTION

The Internet has proven to be a fertile testing ground for the applicability of existing laws to new circumstances. As new technologies develop, the struggle to determine the legality of various applications of that technology often involve groups with varying goals, all of which factor into the final outcome. One such technology is the distribution of digital data over a network from a source to an end user, such as for example, the distribution of music over the Internet. For example, in the music industry, there are several standards for transmitting music over the Internet, each of which puts into focus various issues of the legality of such actions. Various groups have also come to the forefront of the debate involving the distribution of music over the Internet, and the outcome—that is, what laws exist and how they are enforced—reflect not only the technology itself but also the interest of those who stand to win and lose from the enforcement.

Technological advances have furthered the ease with which music can be distributed over the Internet, as well as increased the quality of the music being transmitted. Even before the Internet and the World Wide Web were used by the general public, it was still possible to both encode music and distribute it. This could be done using, for example, a microphone or soundboard. Analog audio signals were digitized and then encoded using, for example, the pulse code modulation (PCM) format. There were, however, many barriers that hindered the widespread distribution of music via computers. Although files could be encoded the encoding methods either did not significantly compress the data or they compressed the data but significantly reduced the quality of the sound that could be produced from the compressed data. Uncompressed files are large and therefore difficult to transmit from one computer to another. In addition, without the connectivity afforded by the global information network (e.g. the Internet), the average personal computer user would not be able to access these music files. Several new technologies, however, have been developed that are able to significantly compress audio data while maintaining its fidelity and effectively use the Internet as a means of distributing the music.

One audio technology that developed from the Internet is RealAudio. Produced by Progressive Networks, RealAudio is an Internet audio delivery system. Progressive Networks produces both a RealAudio server and a RealAudio player, which is distributed freely from the Progressive Networks RealPlayer web site. RealAudio was initially one of the most popular ways for distributing music over the Internet, and still remains popular today. However, RealAudio did not bring to the forefront many of the legal issues involved in distributing music over the Internet that other technologies, such as Moving Pictures Experts Group (MPEG) Audio Layer-3 (MP3) have done.

One reason for RealAudio's popularity is that the RealAudio sound format is highly compressed. This high compression ratio allows audio such as music to be transmitted in a continuous stream over the Internet. Such streaming audio allows a user to listen to a music file as it downloads, instead of having to download the entire file and then listen to it. Furthermore, the compression used by RealAudio allows streaming music files to be transmitted through even relatively slow Internet connections, such as those provided by 28.8 or 14.4 Kbps modems.

The RealAudio encoding and transmission system did bring up some issues of legality and copyright, but several factors prevented the type of debate that now surrounds the MP3 format. First, the technology needed to both encode sound files into RealAudio format and the RealAudio server was available exclusively from Progressive Networks. In addition, this technology is too expensive for the casual user to use to distribute music over the Internet recreationally. This means that, for the most part, distributing music in RealAudio was done by companies that either owned the copyrighted material or paid for the use of the copyrighted material as a promotional tool. For example, the Internet Underground Music Archive (which initially used the RealAudio format but has since switched to LiquidAudio and various other formats) allowed independent artists to put music clips on their site. In such an arrangement, there are really no legal controversies, whether of copyright or otherwise, since all of the involved parties (including the bands or artists, record labels, publishers, and holders of copyright) typically consented to the arrangement.

Another factor that minimizes any legal controversy surrounding the RealAudio format was the fact that sound files are compressed to allow streaming audio over a 28.8 Kbps modem connection only with a significant loss in sound quality. For example, a one-minute music clip in .WAV format is encoded using approximately 12 megabytes and its sound quality is virtually identical to that of a compact disc. When, however, the same one-minute music clip is transmitted over the Internet using a streaming compression technique, it is compressed to occupy many fewer bytes. This decrease in size comes with a decrease in the sound quality, which does not come close to rivaling that of a compact disc. Furthermore, to minimize download time, many RealAudio music clips are not entire songs, but rather, they are only a portion of a song. For this reason, the RealAudio format did not pose a serious threat to the music industry, as it was not an ideal substitute to purchasing music.

Unlike RealAudio, a technology that presents a serious threat to the record industry is the previously mentioned MPEG Audio Layer-3, or MP3, format. Quite simply, the technology behind the MP3 audio format allows for a high compression ratio and CD-quality sound. An MP3 file compresses a sound file, for example, to one-tenth or one-twelfth its original size. This means that a five-minute song that would have been a 60-megabyte file in .WAV format will be a mere five megabytes as an MP3 file, while still retaining near CD-quality sound. Because MP3 encoders are freely available, this format lends itself more readily to homegrown distribution than does the RealAudio format. In fact, the impressive 12:1 compression ratio of MP3 has made the scheme a hot button on the Internet, because file size is no longer as big of an issue as with, say, the .WAV format, and because sound quality doesn't suffer as it does with conventional streaming encoders. Furthermore, MP3 players, encoders, and 'rippers'—programs for snatching a digital audio stream from a CD—are readily available. Unlike RealAudio, the average user can cheaply create MP3 files of copyrighted music. All that is required is a CD-ROM drive and freely available software to encode the audio CD tracks to MP3 format. While it is not illegal for the owner of a copy of an audio work to make another copy for personal use, it is illegal for the owner to distribute that copy.

The technology behind the MP3 file format has spawned a thriving Internet community intent on distributing music. If an arrangement to distribute MP3 files is similar the one used by the Internet Underground Music Archive (which now does feature music in MP3 format) in which the copyright owner consents to distribution over the Internet, then there are no legal issues. When, however, the copyright owner or the company charged by the owner to enforce the copyright does not consent to the distribution, the legality of any such distribution is at least questionable. While the legality of such distribution of copyrighted material is not very controversial, it is complicated by home recording provisions in the law that provide significant non-infringing use for MP3 encoders and rippers. Enforcing these laws is a complicated task for any regulatory body or industry group, such as the Record Industry Association of America (RIAA).

Not surprisingly, the RIAA is one of the major opponents of the distribution of copyrighted music. Recently, the RIAA, which represents the major record labels, has been pursuing on the pirates, using the take-down provisions of the Digital Millenium Copyright Act to remove infringing content from the Internet and pressing for civil actions that seek temporary restraining orders and preliminary injunctions against several top Internet MP3 sites.

Aside from legal action, the RIAA has also attempted to prevent the distribution of copyrighted works by taking educational steps with Universities, where much of the distribution of MP3 files takes place. Colleges and Universities have been central to the growth in popularity of the MP3 format. One reason for this is that many MP3 sites are run by college students who live in dormitories that provide high-speed T1 data connections. These cites represent a significant problem for the recording industry and for popular artists. If, for example, each college in the United States has just two or three students running a server from their computer, there would be thousands of sites offering music for download.

The result of this action by the RIAA is that many of the more blatant sites, that initially were very successful, have been shut down. However, for every site that has been shut down, multiple new cites emerge. The distribution has been driven more underground, but is still readily available. The RIAA's stance on MP3 is simple, they would like to regulate the copying and distribution of MP3 files to ensure that the artists and copyright owners receive their royalties. Because MP3 encoders and rippers have substantial non-infringing uses, RIAA can not prevent or otherwise control the copying of music into MP3 format and can control the distribution of the MP3 files only with difficulty. No matter what course of action the RIAA or other organizations pursue, however, it seems that the benefits of using MP3 technology greatly outweigh the costs, and that the format will continue to be a popular way of distributing music.

One solution to this music distribution problem is to encrypt the music data before it is distributed. One of the main difficulties with encryption is the need to "tie" the encrypted music to a local physical medium. Tying the encryption to software only would not prevent porting the encrypted music with the decryption key to any other similar platform. The music is usually tied to the local hard-drive ID in a case of a PC. In the case of portable devices, encryption/ decryption chips embedded within the portable players will be used to tie the encrypted music to the portable devices.

The current solutions have the following important shortcomings:

Tying the encrypted music to a specific hard-drive poses the imminent danger that a mechanical or electrical failure in the hard drive (e.g. a head crash) would result in the permanent loss of the music it carries. Backup of the encrypted music on another storage medium (using conventional back-up techniques) would not solve the problem because the music is tied to the specific disk that was damaged and the backed-up data files are useless on a hard disk having an identifier that does not exactly match the identifier of the failed disk drive.

Tying the encrypted music to a specific digital music player with a built-in decryption chip is not an attractive option either. Technology is moving rather quickly and a digital music player today may be obsolete in a couple of years. The digital music bought today however, will, in many cases, have a longer lifetime.

Tying the music to a specific portable player reduces the "portability" of the music. One of the most attractive features of portable music, such as CD or cassette is the ability to play it wherever a player exists. In the case of secure digital music the music is tied to the player, which is a significant shortcoming.

Different digital music distributors may elect to use different encryption formats and tying a player to a given encryption format may deem it useless if it cannot be used to play "all music".

What is needed is a system to protect the investment the public is about to make in encrypted digital music.

SUMMARY OF THE INVENTION

The present invention is embodied in an apparatus, system, and method for protecting the investment of the public in digital music using a removable smart card that contains the user's decoding keys and, optionally, the actual decoding apparatus. The present invention allows a relatively high level of security while providing flexibility in use by allowing the purchased digital music to be played on different devices. In addition, the present invention protects the digital music from loss due to hard disk crashes or the need to upgrade the portable device.

In one embodiment of the invention, the apparatus includes a portable handheld device having a detachable smart card for decrypting the encrypted music thereby allowing the portable device to receive and play encrypted music files. The smart card possesses the key and the hardware to decrypt the encrypted music using the key.

Because the encrypted music files are associated with the card and not with the disk, when data is lost due, for example, to a disk crash on one portable player, the music files may be recovered from back-up copies and played on other devices by, for example, detaching the card from the first device and inserting it in a second portable device. Note that a file can be played on a player if it has the smart card that is associated with the file. It is thus easy to upgrade the player without losing the entire music library.

In another embodiment of the invention, the system includes a personal computer (PC) and the smart card connects to one of its communications ports or buses thus allowing the PC to play the encrypted music. This way it is possible to download or backup the music or to upgrade to a new PC without losing the ability to play the purchased copies of the music.

In another embodiment of the invention, the method includes paying for the downloaded digital data using the smart card. In one embodiment, the smart card has a stored monetary value that is read by the smart card reader device. Alternatively, data stored on the smart card, such as personal identification information, can be used to bill the end user for the digital data.

In another embodiment of the invention, the method includes accessing digital data stored at one or more servers using an access key stored on the smart card. In this embodiment, the method includes reading access keys contained on the smart card and accessing the designated server using the access keys.

DETAILED DESCRIPTION

The exemplary embodiment of the invention has two main elements, a portable smart card or smart card that allows the digital data to be decrypted on any device that supports the smart card or chip, and the use of public and private keys in conjunction of a portable smart card or smart card to pay for music through media such as the Internet, to establish a channel with one or more vendors through which music may be purchased and to allow purchasers to protect their investment in purchased encrypted music by tying the encrypted music not to a hard disk or other data storage medium but to a smart card or smart card that can be used with any device that supports the smart card or chip such as a PC or an upgraded player. One exemplary public key/private key based encryption/decryption system that may be used in the subject invention is the well-known Rivest-Shamir-Adelman (RSA) system. An example of Software employing this system is commercially available as Pretty-Good Privacy (PGP).

While the embodiment of the invention is described in terms of a smart card, a processor and memory having the form factor of a credit card, it is contemplated that other types of devices, for example, a smart key, smart card (i.e. integrated circuit) or other device may be used. Any such device desirably contains a processor and memory and should be easily and removably coupled to a dedicated player, palm-top computer, personal computer or other device that can receive and use the digital content.

In addition, while the exemplary embodiment is described in terms of transferring music files, it is contemplated that it may be used to transfer other types of digital content such as pictures, text articles or multimedia combinations of sounds, text and pictures.

The exemplary embodiment of the invention may be described in terms of the different processes that are implemented to realize the system. These processes may be separated into the following categories: managing smart card distribution, establishing credit, selling digital files, purchasing digital files directly through the player, purchasing digital files using a PC or other intermediary device, transferring files among the seller's server, the PC or other intermediary device and the portable player, playing the purchased digital music and using the smart card as a debit card.

The described process is desirably implemented using an electronic communications path between the customer and the music vendor. It is contemplated, however, that other modes of communications may be used. For example, the process of credit approval can be over the phone or through postal or other conventional channels and does not have to be through electronic medium, although electronic medium provides greater efficiencies.

Figure 1:
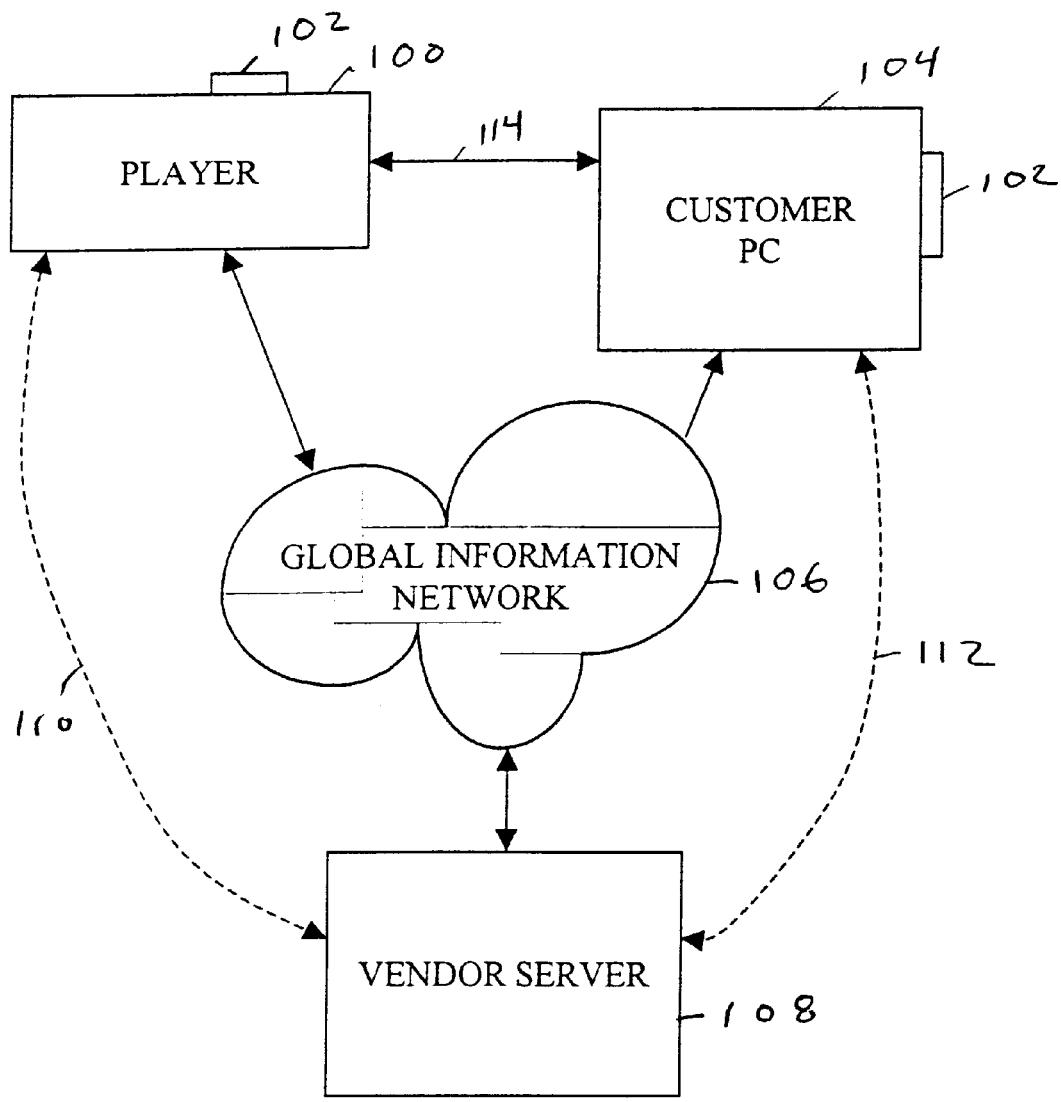
FIG. 1 is a functional block diagram that illustrates various exemplary environments in which the present invention may be used.

FIG. 1 is a block diagram of an exemplary communications system in which the present invention may be used. The communications system includes a player 100 which is coupled to a smart card 102. The player 100 is in communication with either or both of a personal computer 104 and a remote vendor server 108. Communication with the vendor server 108 may be either via a global information network 106 such as the Internet or by a direct link 110. In the exemplary embodiment of the invention, the direct link may, for example, link the player to a bulletin board maintained by the vendor to distribute music files. If the player 100 is coupled to the vendor server via the global information network 106, the vendor server 108 may include a web page that lists music titles that are available for purchase. Through either of these connections, the player 100 is able to provide the customer with the list of available titles, indicate a purchase request to the server 108, and receive the purchased music from the vendor server 108.

As an alternative to a direct interface between the player 100 and the vendor server 108, the customer may select, order and receive digital music using the personal computer (PC) 104 and then transfer the encrypted music files from the personal computer 104 to the player 100. In the exemplary embodiment of the invention, when the PC 104 is used to order and receive the digital music files, the smart card 102 is coupled directly to the PC 104. This coupling may be via a special purpose interface card and connector (not shown) that connects to one of the external ports (e.g. the Universal Serial Bus (USB) port). As with the player, the PC 104 may connect to the vendor server 108 either via a direct dial-up connection 112 or via the global information network 106. Once the music files have been received by the PC 104 they may be transferred to the player 100 via a data communications connection 114 between the player 100 and the PC 104.

Figure 2:
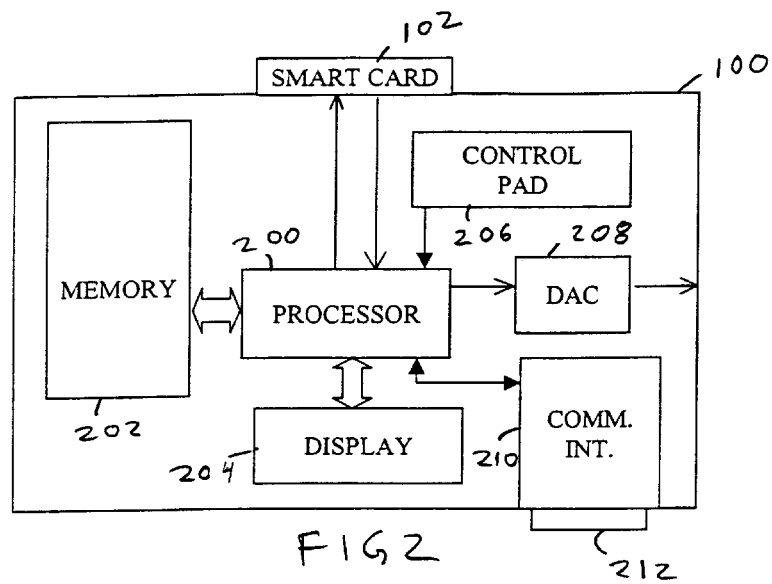
FIG. 2 is a functional block diagram of a portable player suitable for use as the player shown in FIG. 1.

FIG. 2 is a block diagram that shows key elements of the player 100. These elements include a processor 200, non-volatile memory 202, display 204, control pad 206, digital to analog converter (DAC) 208, a communications interface 210 and a data communications port 212. In the exemplary embodiment of the invention, the data communications port 212 may be, for example, a Personal Computer Memory Card International Association (PCMCIA) port. In the exemplary embodiment of the invention, the PCMCIA port is used for communications between the player 100 and the PC 104 and, using a conventional PCMCIA modem (not shown) for communications between the player 100 and the vendor server 108. The operation of the player in selecting, requesting, downloading and playing digital music files is described below with reference to FIGS. 6, 7 and 8. The control pad 206 is used in the exemplary embodiment of the invention to select stored digital music files to be played, to control the audio characteristics of the replayed music (e.g. volume, balance and equalization) and may also be used to input commands that are sent from the device to a remote server, as described below. While this control pad is shown as a set of push-button switches, it is contemplated that it may be implemented using other methods. For example, the player process may include voice recognition software and the functions of the control pad may be implemented in the player process responsive to voice commands provided by the customer to a microphone (not shown) on the player 100. In this sense, the control pad may, more properly be defined as a control system.

Figure 3:
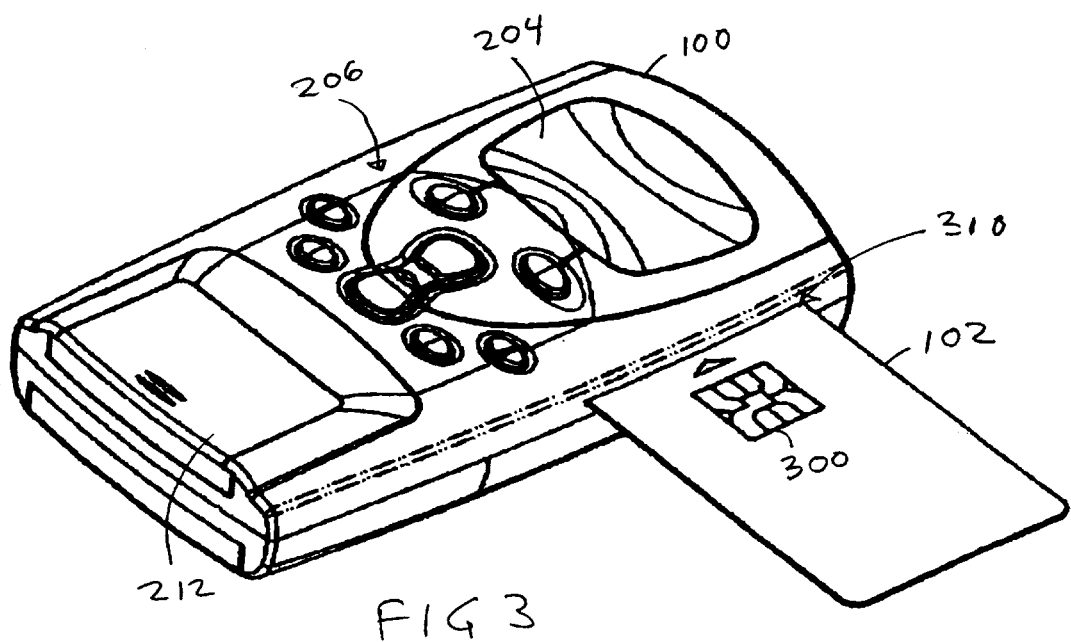
FIG. 3 is a perspective drawing of the player shown in FIGS. 1 and 2.
Figure 4:
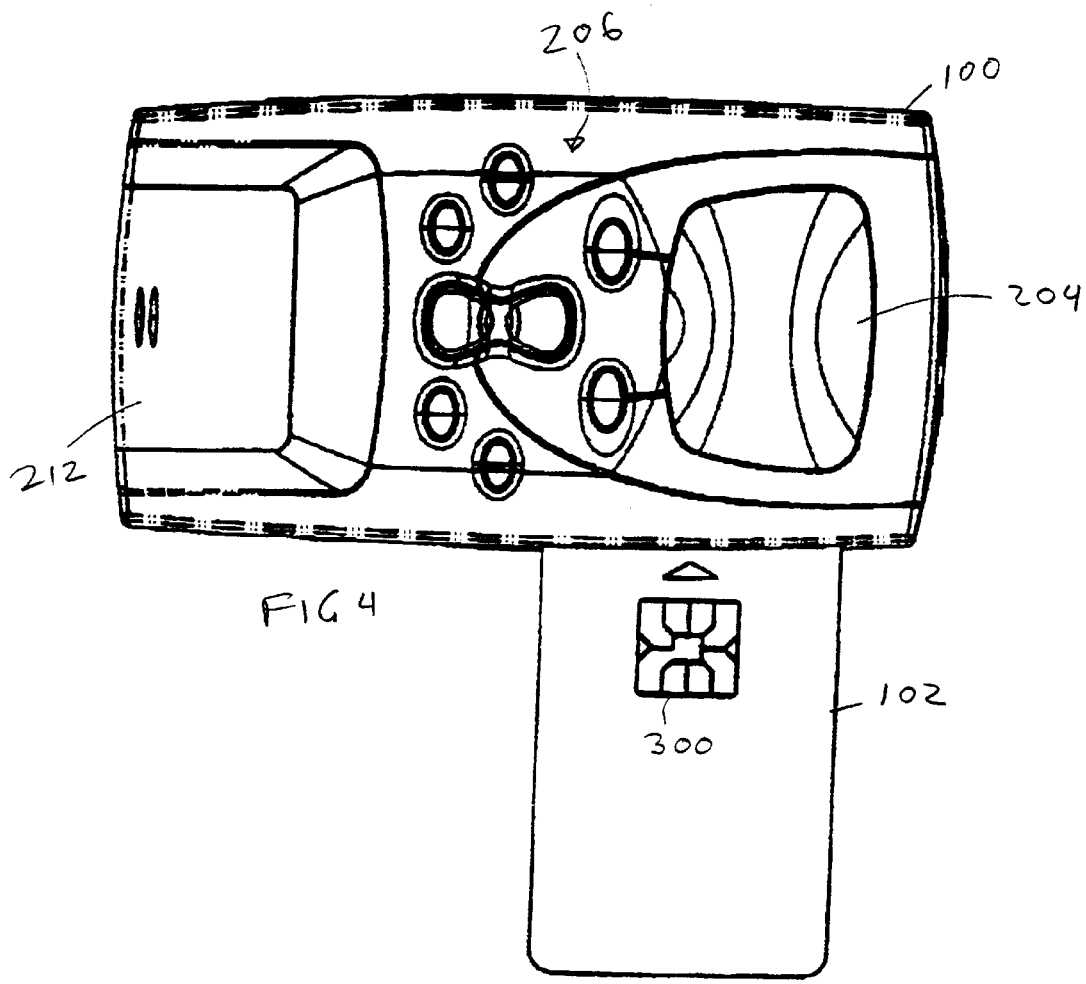
FIG. 4 is a top-plan view of the player shown in FIGS. 1, 2 and 3.
Figure 5:
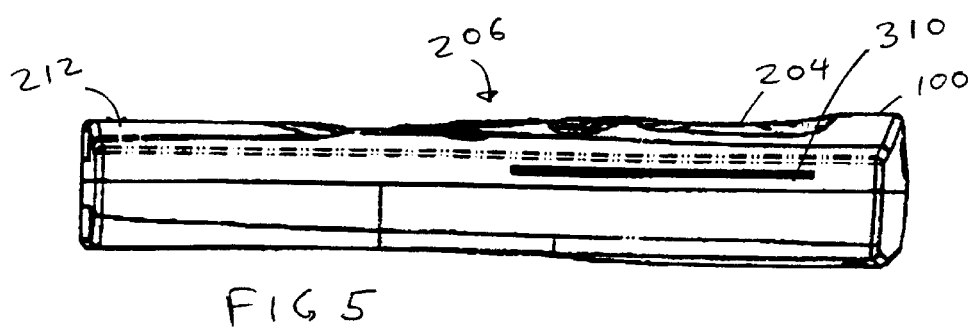
FIG. 5 is a side-plan view of the player shown in FIGS. 1, 2, 3 and 4.

FIG. 3 is a perspective drawing of the player 100 which shows an exemplary physical implementation of some of the features shown in FIG. 2. FIGS. 3 and 4 are a front-plan view and a side-plan view of the player 100. These Figures shown that the player includes a display screen 204, a control pad 206 including eight push-button switches, a communications port 212 and a slot 310 into which the smart card 102 may be inserted. As shown in FIGS. 3 and 4, the smart card 102 is partially inserted into the slot 310. In operation, the smart card 102 is entirely inserted into the body of the player 100 such that no part of the card 102 is outside of the player 100.

FIGS. 3 and 4 also show an exemplary smart card 102. The smart card includes an integrated circuit 300 which performs all of the processing functions of the smart card. As set forth above, although the smart card 102 is shown in the form factor of a credit card, it is contemplated that it may be in other forms. For example, the integrated circuit 300 may be encapsulated in a small module (not shown) which may be inserted into a port (not shown) on the back-side of the player 100.

In the exemplary embodiment of the invention, communication between the customer and the vendor is accomplished using a public key/private key encryption techniques. In addition, the purchased music is stored in the player 100 as encrypted data. The data may be encrypted by the vendor using the customer's public key or it may be encrypted by another method, for example the public/private key encryption can be used to transfer keys for symmetric encryption methods such as DES or triple DES. In the exemplary embodiment of the invention, the customer's public and private keys are stored in the smart card 102. While the public key is accessible to all, the private key is only readable and can be used by the internal electronics of the player.

Managing Smart Card Distribution

Smart card manufacturing and distribution is desirably done only by an authorized vendor. The vendor manufactures and distributes the smart card 102 mainly to the manufacturers of the players 100. The cards 102 would then be distributed by the manufacturers with the players 100. Alternatively, cards may be provided to the music vendors and provided to customers when the customers establish accounts with the vendors. It is also conceivable that individuals may purchase smart cards 102 independently from the player manufacturers or the music vendors. In this instance, the customer may link the card 102 to the player 100 and then establish an account with the music vendor, as described below Whoever sells the smart cards desirably keeps the public and private keys in a secure place and provides vendors, customers and credit bureaus with the ability to authenticate the existence and validity of the public keys, for example via trusted third party authentication entity. This authentication entity may also remanufacture damaged smart cards and re-issue lost or stolen smart cards (e.g. through the music distributors). It is conceivable that the authentication entity may be the digital music distributors.

In the exemplary embodiment of the invention, the smart card 102 purchased by the customer includes both the public key and the private key. To prevent theft, it is desirable for the smart card 102 to hold at least the private key in a disguised format and it may be desirable to include tamper protection that destroys at least the private key when it detects unauthorized attempts to access the key. The private key may, for example, be held in a complementary metal oxide semiconductor (CMOS) memory (not shown) that is powered by a long-life battery, such as a lithium battery. Any attempt to access data on the card that does not conform to a predetermined protocol would cause the processor to remove power from the CMOS memory. Similarly, if a card 102 is reported lost or stolen and the vendor detects an attempt to use the card to purchase music, the vendor may send a command to the card 102 via the player 100 or PC 104 causing the card to destroy the private key.

Establishing Credit

The first step in using the player, in the exemplary embodiment of the invention is to establish a credit account with the music vendor. The vendor receives (through a secure communication link) a request to establish a credit line (or to establish a debit account) with the customer. In response to this request, the vendor asks for the public key and any additional information that the vendor may need to establish the account. This may include, for example, the customer's name, address, driver's license number and information on a credit card or debit card that is held by the customer. This information may be provided through the player 100, on line through a secure communications link to the vendor server 108 or through other media such as telephone, mail or fax. It is contemplated that some of the information (e.g. the user's name, address and the public key) may be read from the smart card 102 and provided to the vendor server 108 by the player 100 or by the customer's PC 104 while other information (e.g. driver's license number and credit card number) are provided by other means. In addition to the public key, the vendor server 108 may also ask the player 100 to provide a digital signature, a short, predetermined message encoded with the customer's private key, to verify that the received public key matches the private key that is stored in the smart card.

The vendor checks with the credit agencies and the authentication entity to ensure that the public key (and the associated private key) are valid and registered to the individual. In addition, the vendor may check the credit rating of the customer and verify that the credit card or debit card and the smart card are registered to the same individual. All of these steps may occur on-line, while the customer is waiting, or may occur off-line with some delay. When the credit check is complete and the public and private keys have been verified, the vendor sends a message (e.g. via e-mail) to the customer indicating that the account has or has not been established. As set forth above, it is contemplated that the smart card 102 may, itself, be a debit card. In this embodiment of the invention, the smart card 102 may include account information, including a current account balance, that may be accessed and debited by the vendor process.

The credit card or debit card information may be used to pay for purchases made by the customer or it may be used for identification purposes only. If used for information purposes, some other payment means must be provided. Once an account has been established, the customer may use it to purchase music.

Selling Digital Files (Music)

Figure 6:
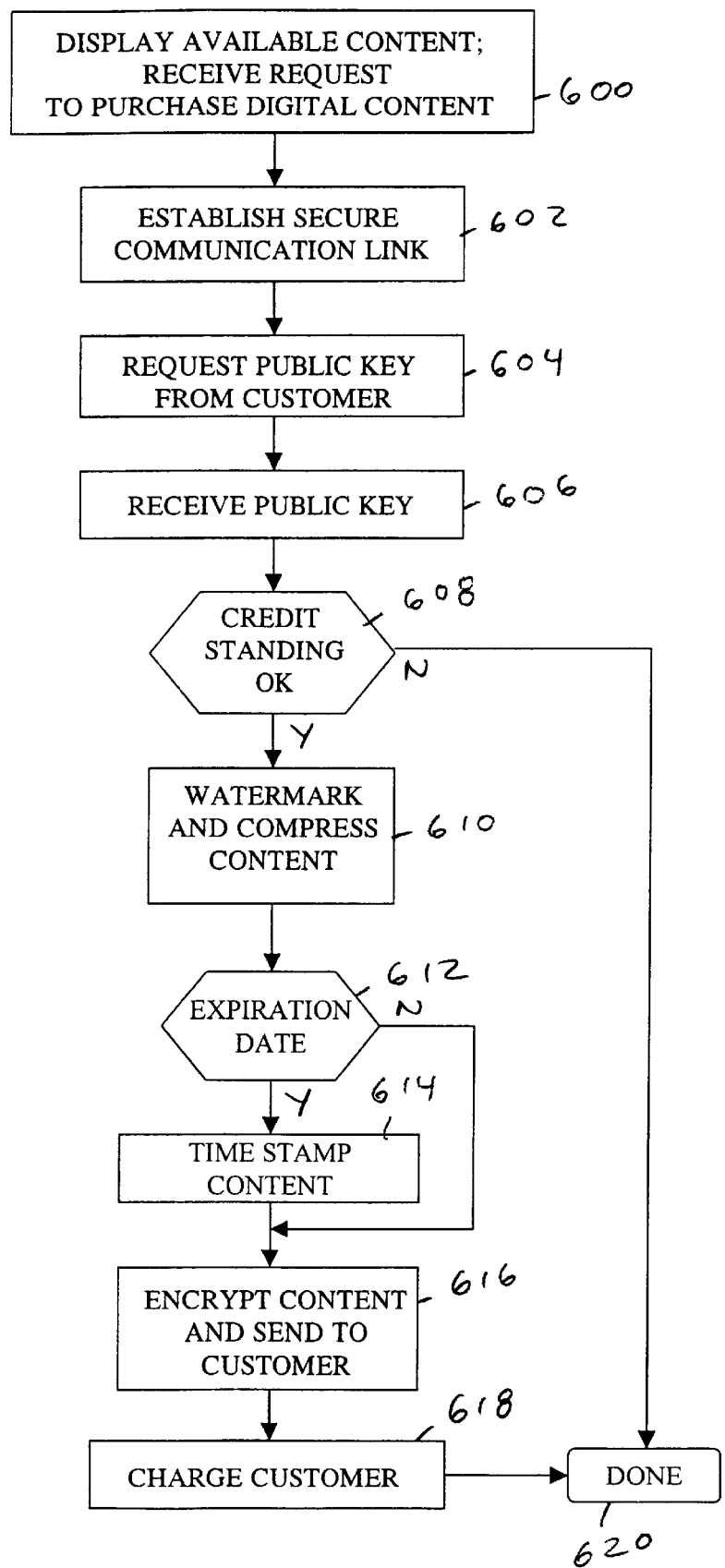
FIG. 6 is a flow-chart diagram of an exemplary process that may be executed by the vendor server shown in FIG. 1.

FIG. 6 is a flow-chart diagram that illustrates the steps performed by the vendor server 108 when it receives a request to purchase music. In this embodiment of the invention, the vendor server 108 is assumed to have a web page connected to the global information network 106 through which digital music files are advertised and sold. Prior to the steps shown in FIG. 6, the customer may access the vendor's web site in order to view titles that may be purchased. The vendor may list the titles and allow the customer to listen to excerpts from the titles, for example, via one of the streaming audio techniques described above, prior to purchase. The web page may be a conventional text web page, encoded in hypertext markup language (HTML) or it may be a special purpose web page containing limited text that may be displayed on the display 204 of the player 200. It is also contemplated that the vendor's web page may be an audio web page that sequentially pronounces the available titles and provides audio instructions for the customer to select, purchase and download a particular digital music file.

Once the customer has decided to purchase a digital music file, The vendor server 108 receives a purchase request at step 600 of FIG. 6. Next, at step 602, the vendor establishes a secure communications link with the customer. This link may be established using the customer's public key or by using some other technique, such as triple DES. Once the secure communications link is established, the vendor server, at step 604 requests the public key from the customer. At step 606, the vendor server 108 receives the public key from the customer. At step 608, the vendor server checks the credit standing of the customer using the public key. This check may determine whether the customer's account is current and whether the public key has been reported as stolen or lost. If the customer's credit is not approved at step 608, the vendor server 108 completes the process by branching to step 620. If the customer's credit is approved at step 608, the vendor, at step 610, watermarks and compresses the requested digital file. At step 612, the vendor server process determines if the purchased digital file has an expiration date. Files with expiration dates may be purchased for less than files without expiration dates because, after some predetermined time, the digital music file will expire and be removed from the memory 202 by the player 100. If the file has an expiration date, then, at step 614, the vendor server process adds a time-stamp to the file indicating the date on which the file should be removed. If, at step 612, it is determined that the file does not have an expiration date, then the vendor server process 108 transfers control to step 616.

At step 616, the vendor server process 108 encrypts the compressed digital music file using the customer's public key and transmits the file to the customer. Finally, at step 618, the vendor server process 108 charges the customer for the purchased file.

Buying Digital Files Using the Portable Player

Figure 7:
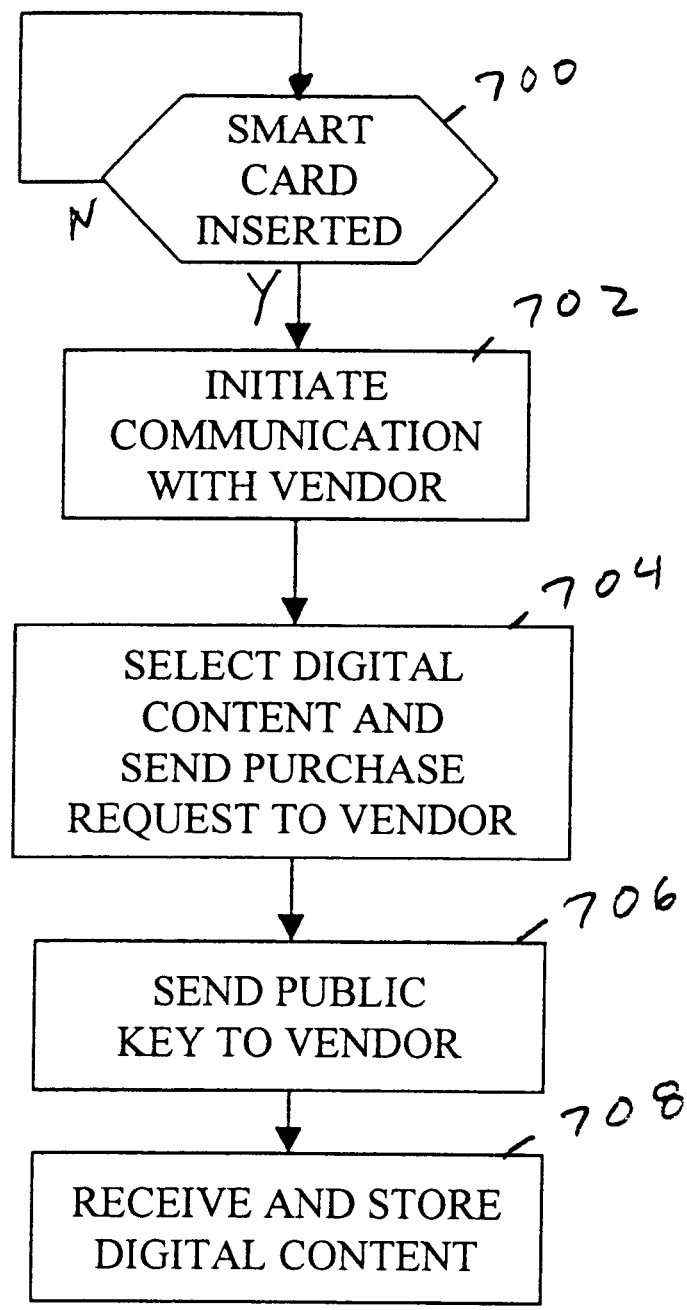
FIG. 7 is a flow-chart diagram of an exemplary process that may be executed by the player or personal computer shown in FIG. 1.

FIG. 7 shows exemplary steps performed by a process running on the processor 200 when a digital music file is purchased by connecting the player 100 to the vendor server 108 either by the direct link 110 or by the global information network 106. The first step in this process, step 700, determines if the smart card has been inserted into the portable player. If the smart card is inserted at step 700 then, at step 702, the player process initiates communication with the vendor server 108. This may involve, for example, executing a special Internet browser on the player 100 and establishing an internet connection with the vendor server 108. Once the connection is established at step 702, the player 100 provides a list of titles that may be purchased and the customer, at step 704, views or listens to this list, makes a selection and sends a purchase request to the vendor server 108. In response to this purchase request, as described above, the vendor server 108 asks the player 100 to provide the customer's public key. If, as described above, this public key indicates that the customer is authentic and has a good credit rating, then the vendor server 108 sends the encrypted and compressed digital music file to the customer and the player 100, at step 708 of FIG. 7 receives this file and stores into the memory 202.

Buying Digital Files Using a PC

Figure 8:
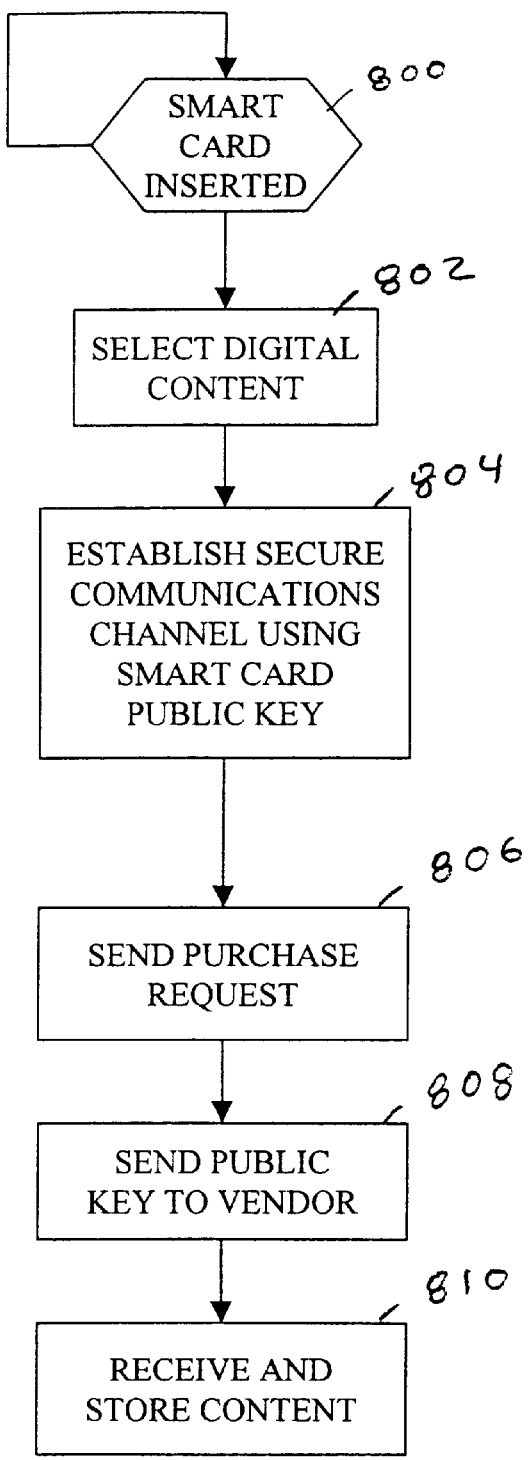
FIG. 8 is a flow-chart diagram of an exemplary process that may be executed by the player or personal computer shown in FIG. 1.

FIG. 8 is a flow-chart diagram of an exemplary process that may be used to purchase digital audio files using the PC 104. At step 800, the PC process interrogates its external port to determine if the smart card is present. As described above, the customer inserts the smart card 102 into a special dedicated receptacle (not shown) that provides an interface between the smart card 102 and the customer PC 104. Next, at step 802, the process allows the customer to select a digital music file to be purchased from the vendor's web site. Next, at step 804, the PC process establishes a secure communication link using the customer's public key that is stored in the smart card. To establish this link, the PC process transmits its public key to the vendor and the vendor sends its public key to the customer. Messages sent from the vendor server 108 to the PC 104 are encoded using the customer's public key and may be decoded only by using the customer's private key. Messages sent from the customer to the vendor are encoded using the vendor's public key and can only be decoded using the vendor's private key.

Once the secure communications link is established, the customer, at step 806, sends a request to purchase a digital music file. In response to this request, the vendor asks the PC 104 to send the customer's public key. At step 808, the PC process sends the public key to the vendor, and the vendor, as described above, performs a credit check, compresses and encodes the requested file. At step 810, the PC process receives and stores the requested digital music file.

When the digital music file is provided by the vendor server 108 to the customer's PC 104, the digital music file may be played directly on the PC, using the smart card 102 to decrypt the file so that it may be expanded by software on the PC 104 and routed to the sound card (not shown) of the PC. The customer may also transfer the digital music file, in encrypted form, from the PC 104 to the player 100 so that the file may be played on the player.

Communication between the player 100 and the PC 104 may occur in one of two modes. First, the digital music file may be transferred to the player through the data communications port 212 and the communications interface 210. The processor 200 receives the data from the communications interface 210 and loads the data into the memory 202 using the file management system of the player 100. Memory 202 may consist of a variety of possible devices: such as a magnetic or optical disk, either removable or fixed, flash memory or random access memory (RAM).

The other mode for transferring data from the PC 104 to the player 100 is to allow the memory 202 to be managed directly by the PC 104. In this configuration, the player 100 includes a separate memory interface (not shown) that is connected to the host directly. The memory 202 in this exemplary embodiment is managed by the memory management environment of the PC 104 for the duration of the download. Once the download is complete, the connection between the processor 200 and the memory 202 is reestablished the processor 202 may access to the downloaded digital file. In the exemplary embodiment of the invention, the memory 202 may be implemented in a variety of configurations to accommodate this second mode of data transfer. For example, the memory 202 may be a dual-ported memory providing a second port to a memory interface (not shown) in the player 200 which may be connected to one of the external ports of the PC 104. Alternatively, the memory 202 may be a removable device, such as a hard disk, that plugs into a programming interface (not shown) in the PC 104 in order to receive the digital music file from the PC.

Playing for the Digital File

In the exemplary embodiment of the invention, the player 100 plays the digital music file under control of the processor 202. In the exemplary embodiment of the invention, the processor fetches the encrypted data from the memory 202, transfers it to the smart card 102 and receives decrypted data from the smart card. The decrypted data is then expanded to reproduce the original digital music file which is converted to an analog music signal by the DAC 208.

There may be concerns that the decoded data provided by the smart card could be intercepted and recorded separately from the encoded data. To prevent this, it may be desirable to establish a secure communication link between the processor 200 and the smart card 102. One way that this may be done is to establish temporary short public/private keys and encode all data sent to the smart card 102 with the short private key and to decode data received from the smart card 102 also using the short private key. The smart card 102 in this embodiment of the invention stores the short private key in a local volatile memory that loses its data when the card 102 is disconnected from the player 100. The smart card uses the short private key to decode data received from, and encode data sent to the processor 200. The establishment of the secure link between the processor 200 and the smart card 102 is an optional step in the player process. The remainder of the player process is described assuming that no secure link is established between the processor 200 and the smart card 102.

After receiving the decrypted data from the smart card 102, the processor 200 decompresses the file and sends it to the digital to analog converter DAC 208, which converts the decompressed file to an analog signal that is sent to an amplifier (not shown) and then to speakers (not shown) to reproduce the audio signal.

The invention has been described in terms of exemplary embodiments, it is contemplated, however that the invention include variations within the scope of the appended claims. For example, it is contemplated that the invention may be realized in a computer program existing on a carrier such as a magnetic or optical disk or a radio frequency or audio frequency carrier wave.

What is claimed:

1. An apparatus for the secure download of digital data to a portable handheld device, comprising:
   a decryption processor, removably coupled to the portable handheld device, the decryption processor including at least one preprogrammed encrypting/decryption key, wherein the decryption processor applies the encrypting/decryption key to digital data received from the portable handheld device and applies the result to the portable handheld device;
   a memory coupled to the portable handheld device, the memory holding the downloaded digital data; and
   a data processor, integral to the portable handheld device and coupled to the memory, wherein, the data processor reads the downloaded digital data from the memory, provides the downloaded digital data to the decryption processor, receives decrypted digital data from the decryption processor and processes the decrypted data to recover the digital data.

2. Apparatus according to claim 1, wherein the downloaded digital data is encoded with a method based on a public/private key algorithm and the decryption processor includes:
   a private key; and
   apparatus including at least one of software and hardware which applies the private key to decode the downloaded data received from the data processor to provide decoded data to the data processor.

3. Apparatus according to claim 2, further including a communications interface coupled to the data processor, the communications interface receiving the downloaded digital data and providing the downloaded digital data to the data processor to be stored into the nonvolatile memory.

4. Apparatus according to claim 3, wherein the communications interface is configured to be coupled to a remote server to receive the digital data and the data processor is configured to provide a command requesting the digital data to the remote server through the communications interface.

5. Apparatus according to claim 4, wherein the data processor is configured to provide the request command to the decryption processor to be encrypted and to receive the encrypted command from the decryption processor and provide it to the communications interface.

6. Apparatus according to claim 1, wherein the data processor is configured to establish a secure communications channel with a remote server, using the public key and the private key stored in the decryption processor, to receive the digital data from the remote server.

7. Apparatus according to claim 6, wherein the decryption processor has a form factor of a debit card, the decryption processor includes debit account information and the data processor sends the debit card information to the remote server through the secure channel to allow the remote server to charge the debit account for the downloaded digital data.

8. Apparatus according to claim 6 further including:
   a display, coupled to the data processor which displays information provided by the remote server indicating a plurality of digital data files that are available for download; and
   a control system, coupled to the data processor that is configured with the data processor to allow selection of one data file of the plurality of digital data files to be downloaded.

9. Apparatus according to claim 8, wherein the remote server maintains a web site on a global communication network to provide the information and the data processor is configured to receive and display information from the web site.

10. Apparatus according to claim 1, wherein:
the memory includes an external memory interface; and
the apparatus further includes:
an external computer, configured to be coupled to the external memory interface of the memory for storing the digital data into the nonvolatile memory.

11. Apparatus according to claim 10, further including:
an adapter configured to couple the decryption processor to the external computer to allow the external computer to use the decryption processor to encrypt and decrypt digital data; and
a further communications interface, configured to be coupled to a remote server to receive the digital data and the external computer is configured to establish a secure communications channel with the remote server using the decryption processor.

12. A system for downloading digital data comprising:
a server containing stored digital data;
an network coupled to said server, wherein said network is adapted for transmitting said digital data;
a communications device coupled to said network for receiving said transmitted digital data;
a portable device coupled to said communications device;
a reader device for reading a smart card; and
a smart card having at least one preprogrammed encryption/decryption key, which is used establish a secure communications channel between the portable device and the server.

13. The system of claim 12 wherein said stored digital data comprises one or more of text, voice, video, and audio.

14. The system of claim 12 wherein said network comprise one or more of the World Wide Web, the Internet, the Intranet, audio frequency and radio frequency signal propagation.

15. The system of claim 12 wherein said communications device comprises one or more of a set-top box, a personal computer, a wireless connection, and a direct modem link.

16. The system of claim 12 wherein said reader device is formed integral with said portable device.

17. The system of claim 12 wherein the smart card includes one or more of access data and electronic payment data.

18. A method for downloading digital data from a vendor to a portable device and accessing the downloaded data using the portable device comprising the steps of:
establishing a secure communications channel between the vendor and the portable device using a digital decryption key;
selecting the digital data to be downloaded from the vendor;
providing the vendor with payment information using the secure communications channel;
receiving and storing the selected digital data; and
decrypting the digital data using the digital decryption key.

19. The method according to 18 wherein the decryption key is contained in a smart card and the method further includes the step of establishing a secure communications link between the portable device and the smart card.

20. A method according to claim 18, wherein the step of providing the vendor with payment information using the secure communications channel includes the step of sending the decryption key to the vendor through the secure communications channel.

21. A method for securely transferring digital content from a server to a customer comprising the steps of:
establishing a secure communications channel between the server and the customer;
receiving a public encryption key from the customer through the secure communications channel;
checking the customer's credit rating based on the received public encryption key;
encrypting the digital content using the received public encryption key; and
transferring the encrypted digital content to the customer.

22. A method according to claim 21, further including the steps of watermarking and compressing the digital content before the step of encrypting the digital content.

23. A method according to claim 21, further including the step of adding a time-stamp to the digital content before transferring the digital content to the customer.

24. A carrier including computer instructions, the computer instructions using a computer processor to implement a method for downloading digital data from a vendor to a portable device and accessing the downloaded data using the portable device, the instructions causing the computer processor to perform the steps of:
establishing a secure communications channel between the vendor and the portable device using a digital decryption key;
selecting the digital data to be downloaded from the vendor;
providing the vendor with payment information using the secure communications channel;
receiving and storing the selected digital data; and
decrypting the digital data using the digital decryption key.

25. A carrier according to claim 24, wherein the computer instructions that cause the computer processor to perform the step of providing the vendor with payment information using the secure communications channel further cause the computer processor to send the decryption key to the vendor through the secure communications channel.

26. A carrier including computer instructions, the computer instructions causing a computer processor to implement a method for securely transferring digital content from a server to a customer, the computer instructions causing the computer processor to perform the steps of:
establishing a secure communications channel between the server and the customer;
receiving a public encryption key from the customer through the secure communications channel;
checking the customer's credit rating based on the received public encryption key;
encrypting the digital content using the received public encryption key; and
transferring the encrypted digital content to the customer.

27. A carrier according to claim 26, wherein the computer instructions further cause the computer processor to perform the steps of watermarking and, compressing the digital content before the step of encrypting the digital content.

28. A carrier according to claim 26, wherein the computer instructions further cause the computer processor to add a time-stamp to the digital content before transferring the digital content to the customer.

* * * * *